UNITED STATES PATENT OFFICE.

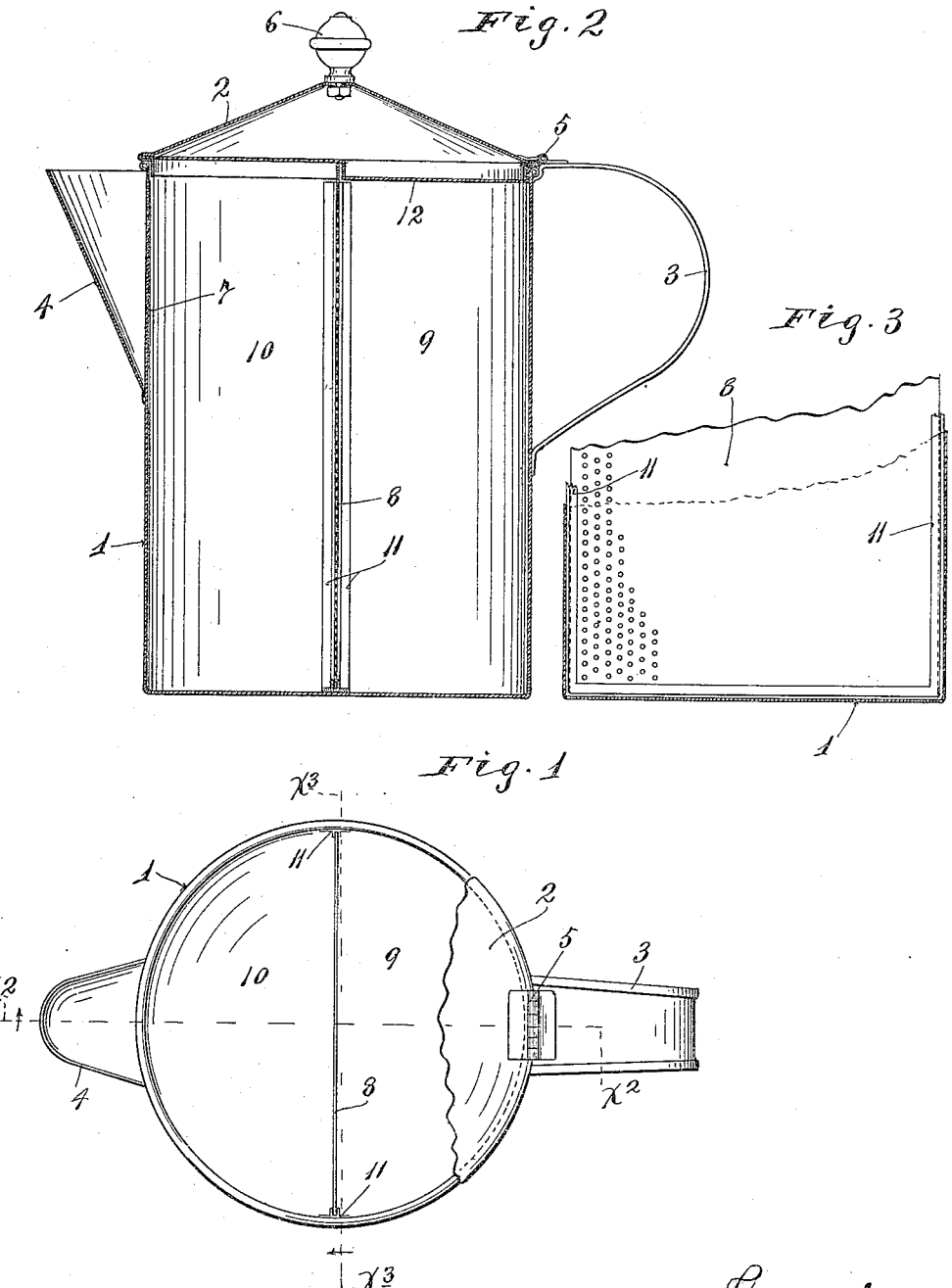

SPENCER ADKINS, OF MINNEAPOLIS, MINNESOTA.

COFFEE-POT.

1,165,376.

Specification of Letters Patent. Patented Dec. 28, 1915.

Application filed November 16, 1914. Serial No. 872,402.

*To all whom it may concern:*

Be it known that I, SPENCER ADKINS, citizen of the United States, residing at Minneapolis, in the county of Hennepin and State of Minnesota, have invented certain new and useful Improvements in Coffee-Pots; and I do hereby declare the following to be a full, clear, and exact description of the invention, such as will enable others skilled in the art to which it appertains to make and use the same.

My invention relates to improvements in coffee pots and has for its object to provide the same with a strainer partition which divides said coffee pot into two compartments, the one, adapted to receive and hold the ground or pulverized coffee, and the other to receive and hold the clear coffee, and from which compartment, said coffee is poured.

To the above end, the invention consists of the novel construction, and arrangement of parts, hereinafter described and defined in the claim.

In the accompanying drawings, which illustrate the invention, like characters indicate like parts, throughout the several views.

Referring to the drawings, Figure 1 is a plan view of the improved coffee pot, some parts being broken away; Fig. 2 is a view principally in transverse vertical sections, taken on the line $x^2$ $x^2$ of Fig. 1; and Fig. 3 is a detail view, partly in elevation, and partly in transverse vertical section, taken on the line $x^3$ $x^3$ of Fig. 1.

Of the parts of the coffee pot, the numerals 1 to 4 inclusive, indicate, respectively, the body, the cover, the handle, and the spout. The cover 2, which is of hollow conical form, with a closed bottom, is hinged at 5, to the handle 3, and is provided with a knob or hand-piece 6, by which said cover, may be opened or closed. That portion of the body of the coffee pot, embraced by the spout 4, is perforated to afford a strainer 7. The parts thus far described, may be of the standard, or any desired design and construction. The body 1, of the coffee pot is divided, by a transverse vertical strainer partition 8, into two compartments 9 and 10. The compartment 9, will hereinafter be referred to, as the receiving compartment, and the compartment 10, will hereinafter be referred to, as the pouring compartment. The ground, or pulverized coffee is placed within the compartment 9, strained through the partition 8, and poured from the compartment 10, through the spout 4.

The strainer partition 8, is detachably secured in position between laterally spaced guides 11, secured to the inner faces of the sides, and bottom, of the body 1, of the coffee pot. These guides 11, hold the strainer partition 8, against lateral movement, but with freedom for vertical sliding movement, so that said strainer partition, may be inserted or removed from the coffee pot. As shown, the strainer partition 8, is formed from a single sheet of closely perforated metal, that is, except at its marginal edges, which are embraced by the guides 11.

That portion of the bottom of the cover 2, overlying the receiving compartment 9, is pressed downward, thus forming a segmental depression 12, which, when said cover is closed, projects into said compartment, and closely fits the vertical walls thereof. The straight portion of the depression 12, extends below the upper longitudinal edge of the strainer partition 8, thereby affording a lap-joint, between the two compartments 9 and 10, which prevents the coffee grounds from entering the compartment 10, during the pouring of the coffee.

By the use of the strainer partition 8, the customary strainer placed over the cup, and through which the coffee is poured, may be eliminated. The strainer partition 8, may be readily removed from the coffee pot for the purpose of cleansing the same.

Obviously the depression 12, will keep the receiving compartment 9, completely closed in case the cover 2, should slightly open in the pouring of the coffee and thereby prevent any of the grounds from entering the compartment 10.

It is of course understood that the term "coffee pot," is herein used in a broad sense to cover teapots and the like.

The above described invention has in actual usage proven highly efficient for the purpose had in view.

What I claim is:

A coffeepot having an upright strainer partition, dividing said coffee pot into a receiving compartment and a pouring compartment, the cover of said coffee pot having a depression adapted to enter the upper end of said receiving compartment, to close the same and form a lap-joint between said strainer partition and said cover.

In testimony whereof I affix my signature in presence of two witnesses.

SPENCER ADKINS.

Witnesses:
 EVA E. KÖNIG,
 HARRY D. KILGORE.

Copies of this patent may be obtained for five cents each, by addressing the "Commissioner of Patents, Washington, D. C."